Taggart, Chichester & Mills,
Grain Conveyer.
No 3,206. Reissued Nov. 24, 1868.
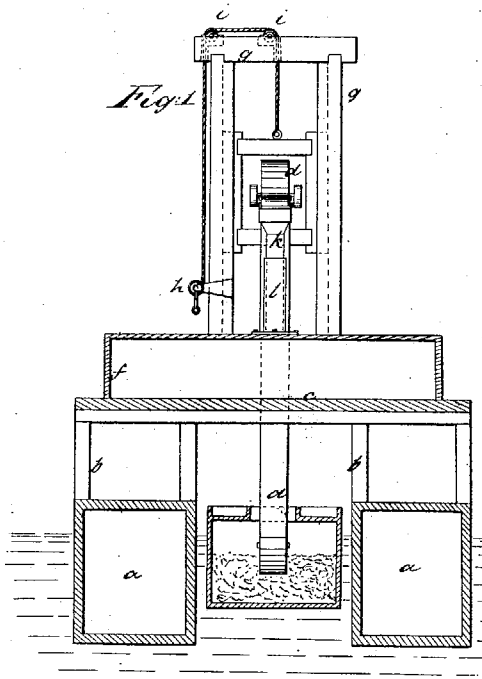
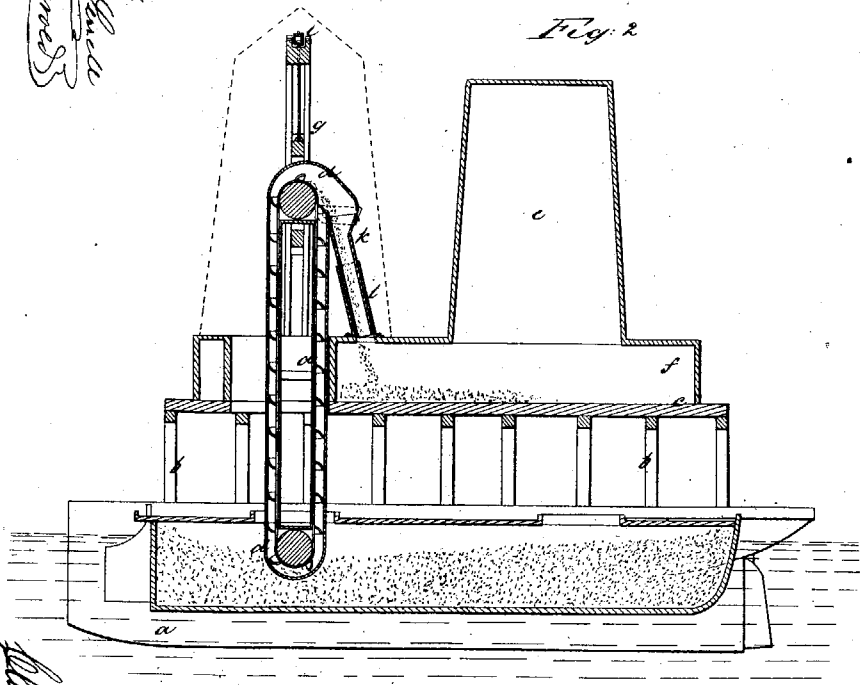
Witnesses,
Lemuel W. Serrell
Thos. Geo. Harvey
Inventors,
Clark F. Mills
Francis Taggart
Lewis S. Chichester
N. PETERS, PHOTO-LITHOGRAPHER, WASHINGTON, D. C.

UNITED STATES PATENT OFFICE.

LEWIS S. CHICHESTER, GEORGE H. NICHOLS, AND CLARK W. MILLS, OF BROOKLYN, NEW YORK, ASSIGNEES, BY MESNE ASSIGNMENTS, OF FRANCIS TAGGART, LEWIS S. CHICHESTER, AND CLARK W. MILLS.

IMPROVEMENT IN GRAIN-ELEVATORS.

Specification forming part of Letters Patent No. 48,495, dated June 27, 1865; antedated June 12, 1865; Reissue No. 3,206, dated November 24, 1868.

*To all whom it may concern:*

Be it known that FRANCIS TAGGART, LEWIS S. CHICHESTER, and CLARK W. MILLS, of Brooklyn, in the county of Kings and State of New York, did invent and make a certain new and useful Improvement in Floating Elevators for Grain, &c.; and the following is hereby declared to be a full, clear, and exact description of the said invention, reference being had to the annexed drawings, making part of this specification, wherein—

Figure 1 is a cross-section of the improved floating elevator, and Fig. 2 is a longitudinal section of the same.

Similar marks of reference denote the same parts.

Grain any many other articles generally arrive at tide-water in canal-boats and barges, and usually in bulk. Heretofore it has been usual to discharge such grain, by a steam-elevator, into a storehouse, or else into a vessel, for transportation, by means of a floating elevator. These floating elevators have to be placed between the canal-boat or barge and the vessel or storehouse, and in wet weather the discharging of the cargo often has to be suspended, because the hatches cannot be left open for introducing the elevator.

The nature of the said invention consists in an elevator applied between two floats, and in a deck or house covering the space between said floats, and into which space the canal-boat or barge is floated, so as to be under cover, and at the same time the elevator is made much more steady, in consequence of its base being broader, and space is furnished in the deck or house for the temporary reception and storage of grain or other materials, or its transportation from place to place, and the same deck or house can be used for drying, cleaning, and cooling grain previous to its delivery on shipboard, or for grinding grain or feed, or any like work arising in connection with the materials transferred.

In the drawings, *a a* are hollow floats or narrow vessels, with timbers extended sufficiently above the decks, as at *b b*, for the reception of a platform or deck, *c*, that connects the floats together, and at the same time ample space is left between the floats for a canal-boat or barge to be drawn in, and have its cargo discharged while beneath, and protected by said platform or deck *c*.

The floats *a a* should be provided with rudders, as usual, and with propellers, driven by a suitable engine or engines, so as to be propelled or moved from place to place, as occasion may require. The engines employed for the propeller should also be fitted to uncouple, in order that they may be employed for actuating the elevator *d*, or performing any other work that may be done on the floating elevator.

A house, *f*, may be constructed upon the deck or platform *c*, of a size and shape adapted to the work to be performed in it.

A tower is represented that can contain a drier and cooler for the grain, and also a second elevator, for passing the grain to a vessel or storehouse, and in this house *f* fanning-mills and machines for cleaning or grinding grain may be introduced, if desired.

The elevator *d* is set, to be raised or lowered, in a frame, *g*, by means of a winch, *h*, from which a rope or chain passes over the pulleys *i i* to said elevator *d*, this device being provided for raising the elevator as the canal-boat or barge is drawn in between the floats, and for lowering said elevator as the contents of the vessel are discharged. The elevator *d* is represented with a spout, *k*, that passes into the trunk *l*, so that the delivery pipe or spout will not become disconnected or allow the material to spill out as the elevator is raised or lowered. The elevator *d* should be inclosed in a house or tower, as seen by dotted lines in Fig. 2.

A canal-boat is represented at *m*, and the material is shown in bulk as being delivered into the house *f* by the elevators *d*.

The elevators heretofore made have acted transversely of the vessel to be discharged, the axes of the drums thereof standing lengthwise of the vessel. This is inconvenient in many instances where the elevator-drums are large and the boats narrow. This elevator can be more conveniently applied than those before named.

What is claimed, and desired to be secured by Letters Patent, is—

1. A floating elevator formed by two vessels or floats connected together, and leaving a space for a boat or barge, in combination with an elevating apparatus.

2. An elevator, *d*, fitted to be raised or lowered, in combination with the floats *a a* and platform connecting said floats and supporting the elevator, substantially as set forth.

3. A grain-elevator fitted upon a float, and arranged so that the axis of the elevator-drum is at right angles, or nearly so, to the float, in order that the elevator may act longitudinally of the vessel to be discharged, substantially as specified.

Dated October 22, A. D. 1868.

GEORGE H. NICHOLS.
CLARK W. MILLS.
LEWIS S. CHICHESTER.

Witnesses:
CHAS. H. SMITH,
GEO. T. PINCKNEY.